United States Patent [19]
Mercer

[11] 3,788,522
[45] Jan. 29, 1974

[54] NOZZLE STRUCTURE FOR INJECTION MOLDING MACHINE
[75] Inventor: James R. Mercer, Akron, Ohio
[73] Assignee: McDowell-Welman Engineering Company, Cleveland, Ohio
[22] Filed: Aug. 26, 1971
[21] Appl. No.: 175,296

Related U.S. Application Data
[63] Continuation of Ser. No. 802,785, Feb. 27, 1969, abandoned.

[52] U.S. Cl............ 222/146 R, 222/568, 425/247
[51] Int. Cl............................................... B29f 1/03
[58] Field of Search ....... 222/146 R, 146 H, 146 HE, 222/386, 389, 413, 566, 568, 569; 425/247-250, 243-250; 18/30 N

[56] References Cited
UNITED STATES PATENTS
2,899,054  8/1959  Creutz.................. 18/12 DM UX 3,108,326  10/1963  Thiel................. 18/30 NR
3,267,518  8/1966  Juel.................. 18/12 DM
3,281,898  11/1966  Compton.......... 18/30 NR
3,354,507  11/1967  Orrevad........... 18/30 NV FOREIGN PATENTS OR APPLICATIONS
448,442  5/1948  Canada............. 18/30 NM Primary Examiner—Robert B. Reeves
Assistant Examiner—David A. Scherbel
Attorney, Agent, or Firm—McNenny, Farrington, Pearne & Gordon

[57] ABSTRACT
There is provided an improved nozzle structure for an injection molding machine characterized by a generally tubular body having a probe portion, a cylindrical plug portion, and a radial flange adapted for coaction with one end of a tubular heating cylinder of said machine to prevent axial movement thereof into the tubular heating cylinder.

8 Claims, 4 Drawing Figures

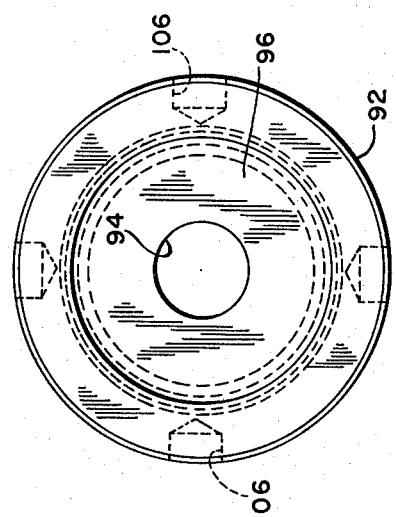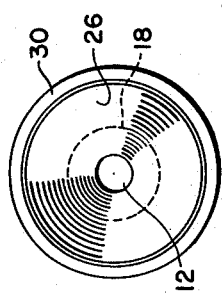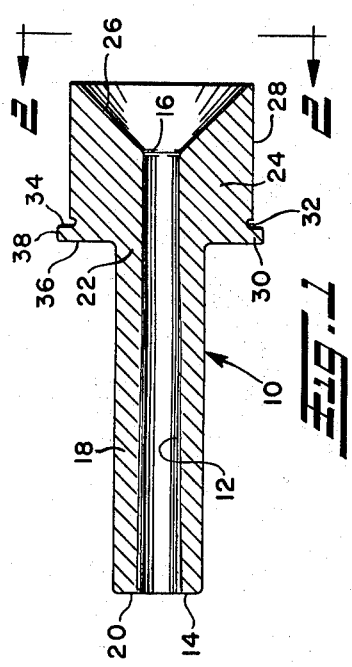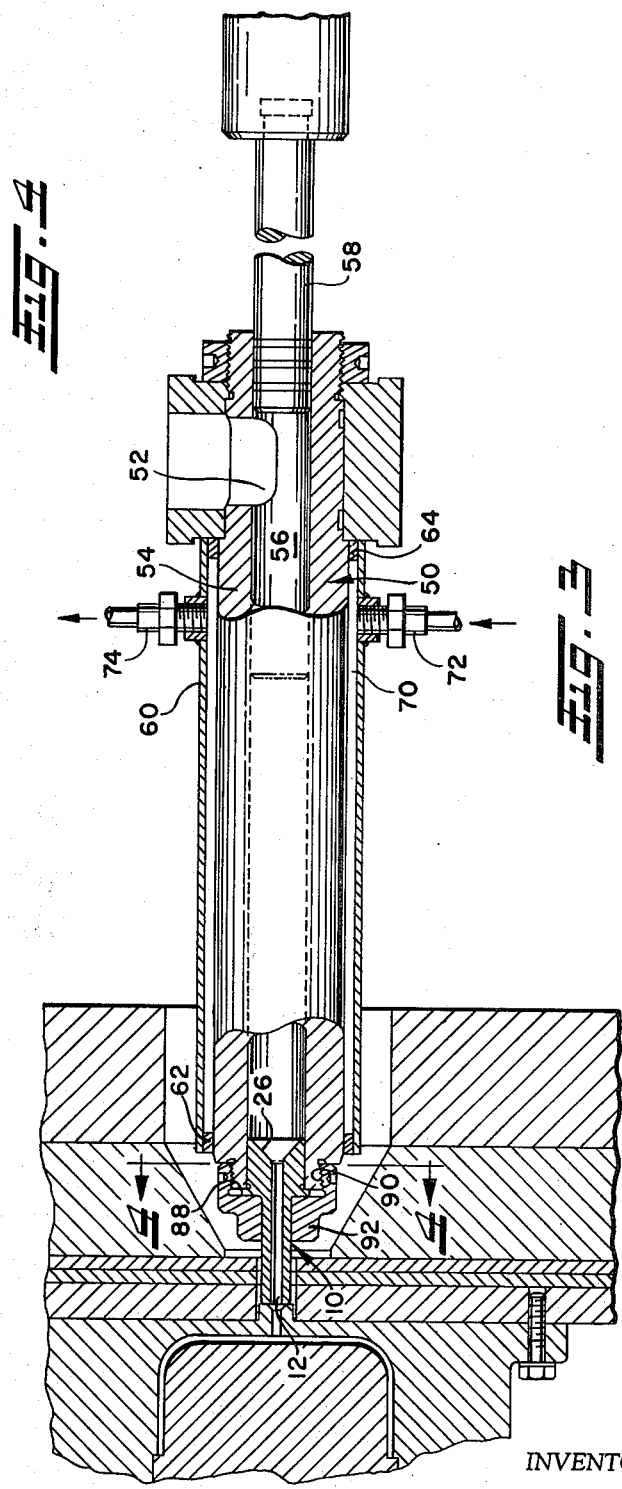

NOZZLE STRUCTURE FOR INJECTION MOLDING MACHINE

The application is a continuation of Ser. No. 802,785, filed Feb. 27, 1969, now abandoned.

BACKGROUND OF DISCLOSURE

This invention relates to apparatus for the injection molding of plastic materials such as rubber, and more particularly to the structure of a nozzle and its combination with a heating cylinder for the plastic material.

The structure of a suitable nozzle and its combination with one end of a heating cylinder in an injection molding machine has heretofore been source of considerable difficulty, and numerous efforts have been made to provide a satisfactory nozzle structure in such devices. A particular problem has been with leakage of plastic material past the seals at the end of the heating cylinder during injection resulting in the necessity to provide special sealing means.

It has now been found that with a simple nozzle structure of the type hereinafter described, the problems of leakage at the end of the heating cylinder and the problem of providing for sufficient heat transfer from the cylinder through the nozzle to the core thereof to prevent solidification of the resin within the nozzle can be achieved with the structure hereinafter described. Sealing is obtained on an axially extending surface as distinct from a radially extending surface. The structure is simplified, and no difficulties are experienced with inadequacy of heat transfer to the nozzle body from the heating cylinder.

These objectives are achieved to a principal extent through employment of two physical factors: (*a*) location of the throat of the nozzle well within the body of the heated cylinder, and (*b*) maintaining a very small clearance between the nozzle body and the cylinder wall, i.e., not in excess of .003 inch, and preferably less than .002 inch. By observing these desiderata, separate heat controls for the nozzle are avoided and excellent heat transfer to material in the nozzle is obtained, as well as other advantages.

Reference may be had to U.S. Pat. No. 3,194,868 which discloses an apparatus of the type in which the present invention may be utilized.

BRIEF STATEMENT OF THE INVENTION

Briefly stated, the present invention is in a nozzle for an injection molding machine which is adapted for insertion in a bore in one end of a tubular heating cylinder body having a radial abutment surface adjacent said bore and comprising a generally tubular body having an axially extending bore open at each end, a probe portion having a distal extremity and a proximal end, and a cylindrical plug portion joined with said probe portion at its proximal end and including a flared opening diverging from said axially extending bore toward the outer surface of said cylindrical plug portion. There is further provided a radially extending abutment flange disposed adjacent the proximal end of the probe portion and having a diameter greater than the cylindrical plug portion for engagement with the radial surface of said tubular heating cylinder. The function of the flange is to prevent axial movement of the nozzle. It is not intended to function for sealing purposes, the latter being otherwise achieved.

The nozzle of this invention is adapted to be inserted in the exit extremity of the heating cylinder with very close clearance being observed and to be retained therein against outwardly axial movement with respect to the cylinder by means of a nut adapted to dispose the radially extending flange in abutting engagement with the radial abutment surface of the heating cylinder. The clearance between the plug portion of the nozzle and the heating cylinder should not exceed 0.003 inch and preferably not exceed 0.002 inch. In a specific embodiment the tolerance on the plug portion and on the cylinder bore are each ±0.0005 inch. Generally, the diameter of the plug portion is larger than the diameter of the probe portion.

BRIEF DESCRIPTION OF THE DRAWINGS

This invention may be better understood by having reference to the annexed drawings which illustrate an embodiment of this invention and illustrate its association with other components of an injection molding machine, and wherein:

FIG. 1 is a cross-sectional view of a nozzle in accordance with this invention.

FIG. 2 is an end view of the nozzle shown in FIG. 1 as it appears in the plane indicated by the line 2—2.

FIG. 3 is a fragmentary sectional view through a part of an injection molding device including the tubular heating cylinder, the nozzle, and the injection apparatus and through a portion of an associated mold.

FIG. 4 is a plan view of one form of a retaining nut for a nozzle of the type shown in FIGS. 1 and 2.

DETAILED DESCRIPTION OF DRAWINGS

Referring now more particularly to FIGS. 1 and 2, there is here shown one form of nozzle in accordance with the present invention. The nozzle is a generally tubular body 10 having an axially extending bore 12 open at each end. The axially extending bore 12 is desirably tapered slightly, being wider at the mold-contacting extremity 14 than at the throat portion 16. The nozzle includes a probe portion 18 having a distal extremity 20 and a proximal end 22. A cylindrical plug portion 24 is provided at the proximal extremity 22 of probe portion 18 and includes a flared opening 26 diverging from the throat 16 of axially extending bore 12 toward the outer surface 28 of cylindrical plug portion 24. In the specific embodiment of FIG. 2, the included angle of the flared opening 26 is 90°. There is also provided a radially extending abutment flange 30 disposed adjacent the proximal end 22 of the probe portion 18, which flange has a diameter greater than the cylindrical plug portion and is adapted for abutting engagement with the radial abutment surface of the tubular heating cylinder member, hereinafter described. As shown in FIG. 1, the radial flange 30 at its juncture with the cylindrical plug portion 24 is provided with a stress relief notch 32. The radial surface 34 on the flange 30 is desirably finished for best abutting coaction with a correspondingly finished surface on the tubular heating cylinder. The opposite surface 36 of the radial flange 30 is adapted for seating of a retaining member which cooperates with the tubular heating cylinder to retain surface 34 in abutting engagement with the radial surface of the tubular heating cylinder.

In the fabrication of the nozzle member, the machining of the cylindrical plug portion is such that a very tight fit with the internal bore of the heating cylinder is secured. The throat portion 16 is disposed well within the bore of the cylinder for utilization of heat applied to the cylinder body from one source and to provide for efficient transfer of heat through the plug portion 24 to the plastic material. The flared portion 26 of the bore operates as a funnel portion directing molten material into the axially extending bore 12. It is desirable that sharp corners should be rounded to provide a throat portion 16 as shown in FIG. 1. In order to relieve local stress, the surface 34, the relief notch 32 and the outer marginal or peripheral edge 38 of flange 30 are desirably shot peened. Also, the surface extending along the tubular probe portion 18 and including the rounded surface 40 is also shot peened for stress relieving purposes. The distal extremity 14 may be squared off in the manner shown in FIG. 1, or it may be a spherical section, as desired. The diameter of plug portion 24 is about 3 times the diameter of probe portion 18 in the specific embodiment shown in FIG. 2.

Desirably, these nozzles have a Rockwell hardness on the "C" scale of from 55 to 57.

Referring now to FIG. 3 there is illustrated apparatus which may be used in conjunction with the nozzles of the present invention, which apparatus comprises a tubular heating cylinder body generally indicated by the numeral 50. This cylinder may be supported in any suitable manner in the housing of an injection molding machine. An opening 52 is provided in the cylinder wall 54 which opening is adapted to receive one end of a hopper, another cylinder, or any other suitable means, not shown, for feeding a thermosetting plastic material such as, for example, natural or synthetic elastomeric materials in a cold or raw state into the charging chamber 56 of the cylinder. The inner diameter of the charging chamber 56 is adapted to conform to the piston 58 which is arranged to reciprocate therein and to that of plug portion 24 of the nozzle. Surrounding the outer wall of cylinder 50 immediately forward of the opening 52 is an elongated cylindrical sleeve 60 having rings 62 and 64 secured to the inner surface thereof. The sleeve 60 when mounted on the cylinder 50 defines a liquid jacket 70 into which heated liquid may be introduced through the inlet fitting 72 and discharged through the outlet fitting 74. The jacket 70 may also be used to cool the cylinder 50 whenever the temperature of the cylinder rises too high. In the normal operation of the cylinder, the temperature of the fluid, e.g., water, introduced into the jacket 70 is in the range from 150° to 250° F. As the material is moved through the cylinder chamber surrounded by the jacket 70, it becomes heated to the temperature which will produce the desired degree of plasticity. Since polymerization or vulcanization is often a function of time as well as temperature, means should be provided to chill the heating cylinder 50 if the normal operating cycle is interrupted or halted for an appreciable amount of time.

As indicated above, the extreme lower extremity of the heating cylinder 50 is provided with a radially extending abutment surface 88 which coacts with the surface 34 of flange 30 on nozzle 10. The respective surfaces 34 and 88 are brought into and maintained in abutting engagement by means of a collar such as that shown in FIG. 4. The exit extremity of heating cylinder 50 is conveniently externally threaded at 90 to receive collar 92. Collar 92 is provided with a central bore 94 which is oversized with respect to the diameter of the probe portion 18 of nozzle 10. The inner, flange-confronting surface 96 of collar 92 is machined and adapted to engage the surface 36 of radially extending flange 30 on nozzle 10. Collar 92 is conveniently provided with one or more circumferentially spaced radial bores 106 which serve as receptacles for a spanner wrench useful as an aid in installing and removing nozzle 10 with respect to heating cylinder 50. Collar 92 does not have to be tightly drawn up on the nozzle.

As indicated above, the diameter of cylindrical plug portion 24 is such as to closely fit the internal bore of cylinder bore 50. The tolerances are plus or minus .0005 inch. The throat is disposed well within bore 50. This insures excellent heat transfer from the heating cylinder walls to the nozzle. It also restricts passage of heated plastic material between the cylindrical plug portion and the heating cylinder body. Experience has shown that with a conventional extrusion rubber recipe under conventional extrusion conditions, penetration of the rubber in the clearance seldom exceeds 3/4 of the axial length of the plug portion. The leading edge of the plastic in the clearance forms an excellent seal. Leakage fails to occur because under the dimensional limits with a conventional rubber recipe at normal injection pressure and temperature, the pressure drop from the internal entrance to the clearance to the terminator of flow for so highly viscous a material is sufficient to prevent leakage. Generally, the axial length of the plug portion 24 is from 50 to 100 percent of the diameter of the cylinder bore, and preferably is about 75 percent. Experience has shown that the nozzle is easily removed from the cylinder 10 by removal of the retaining nut or collar to enable cleaning of the apparatus. No problems with sealing the system are experienced. Auxiliary nozzle temperature control means are not required.

Many means for securing the nozzles of the present invention to the exit end of the heating cylinder may be provided. Also, the probe portion may be a separate member threadedly engaged with a tapped cylindrical plug portion. However, the simplest and best mode of embodying the invention has been described, and such modifications with respect to attachment to the heating cylinder and different structures for the nozzle will be readily apparent to those skilled in the art.

What is claimed is:

1. In combination in an injection molding machine, a tubular heating cylinder body including an inlet end and an exit end, an axial bore of constant diameter adjacent the exit end open at each end extending through said cylinder, said exit end having an abutment surface at the extremity of and surrounding said bore, a nozzle for said exit end comprising a generally tubular body extending within said heating cylinder and having:
   a. an axially extending bore open at each end;
   b. a probe portion having a distal extremity and a proximal end;
   c. a cylindrical plug portion of constant diameter joined with said probe portion at its proximal end, and including a flared opening diverging from said axially extending bore toward the outer surface of said cylindrical plug portion; and
   d. a radially extending abutment flange disposed adjacent the proximal end of said probe portion and having a diameter greater than said cylindrical plug portion for abutting engagement with said abutment surface; and means for securing the abutment flange in abutting engagement with said abutment surface, the axial length of said plug portion being from 50 to 100 percent of the diameter of said axial bore in said cylinder, and the clearance between said axial bore and said plug portion being no more than 0.003 inch, whereby an axially extending circumferential seal between the plug portion and the axial bore of said heating cylinder is formed.

2. A combination in accordance with claim 1 in which the cylindrical plug portion is integral with said probe portion.

3. A combination in accordance with claim 1 in which the axially extending bore is tapered having the larger diameter at the distal extremity of said probe portion.

4. A combination in accordance with claim 1 in which the surface of said flared opening to its intersection with said axially extending bore is conical.

5. A combination in accordance with claim 1 in which the intersection with said axially extending bore is rounded.

6. A combination in accordance with claim 1 in which the distal extremity of said nozzle is flat and lies in a plane perpendicular to the axis of the nozzle.

7. A combination in accordance with claim 1 in which the radially extending flange is integral with said cylindrical plug portion.

8. The combination of claim 1 including an external thread on said tubular heating cylinder body and the means for securing the flange is a threaded nut coacting between said flange of said nozzle and said cylinder.

* * * * *

UNITED STATES PATENT OFFICE
CERTIFICATE OF CORRECTION

Patent No. 3,788,522   Dated January 29, 1974

Inventor(s) James R. Mercer

It is certified that error appears in the above-identified patent and that said Letters Patent are hereby corrected as shown below:

Columns 4 and 5, Claim 1 should read as follows:

-- In combination in a rubber injection molding machine, (1) a tubular heating cylinder body including an inlet end and an exit end, an axial bore extending through said cylinder, said axial bore being of constant diameter adjacent the exit end, said exit end having an abutment surface at the extremity of and surrounding said bore, (2) a nozzle for said exit end comprising a generally tubular body extending within said heating cylinder and said nozzle having:

(a) an axially extending bore open at each end;

(b) a probe portion having a distal extremity and a proximal end;

(c) a cylindrical plug portion of constant diameter joined with said probe portion at its proximal end, and including a flared opening diverging from said axially extending bore toward the outer surface of said cylindrical plug portion; and (d) a radially extending abutment flange disposed adjacent the proximal end of said probe portion and having a diameter greater than said cylindrical plug portion for abutting engagement with said abutment surface; and (3) a circumferential seal coacting between the plug portion and said axial bore in said cylinder, said seal consisting of material forced into the clearance

UNITED STATES PATENT OFFICE
CERTIFICATE OF CORRECTION

Patent No. 3,788,522   Dated January 29, 1974

Inventor(s) James R. Mercer

It is certified that error appears in the above-identified patent and that said Letters Patent are hereby corrected as shown below:

Claim 1, continued:

between said plug portion and said axial bore in said cylinder from the material being injected;
(4) means for securing the abutment flange in abutting engagement with said abutment surface, the axial length of said plug portion being from 50% to 100% of the diameter of said axial bore in said cylinder, and the clearance between said axial bore and said plug portion being no more than 0.003 inch, whereby an axially extending circumferential rubber seal between the plug portion and the axial bore of said heating cylinder is formed. --

Column 6, Claim 5 should read as follows:

-- A combination in accordance with Claim 1 in which the intersection of said flared opening with said axially extending bore in the nozzle is rounded. --

Signed and sealed this 2nd day of July 1974.

(SEAL)
Attest:

EDWARD M. FLETCHER, JR.
Attesting Officer

C. MARSHALL DANN
Commissioner of Patents